UNITED STATES PATENT OFFICE.

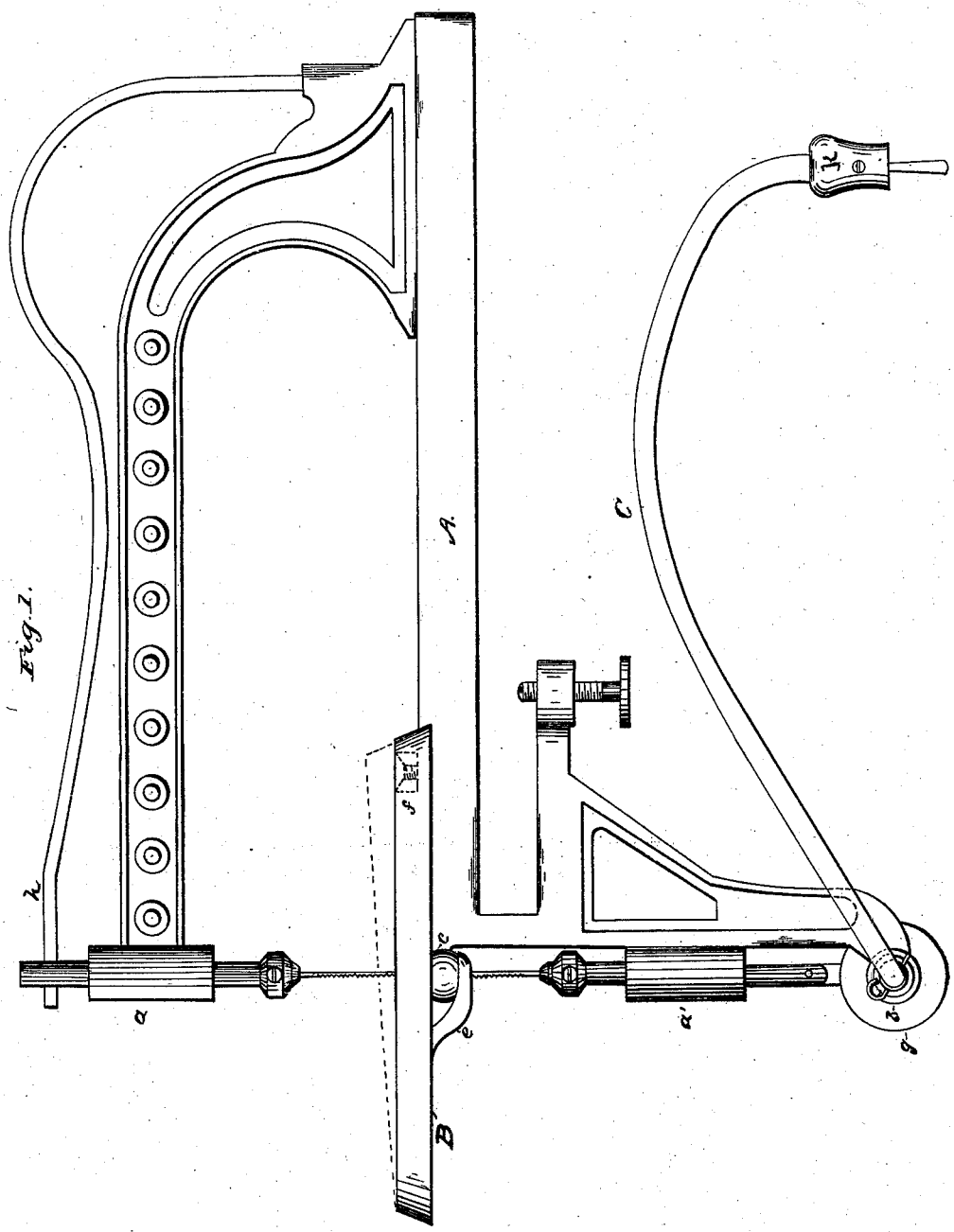

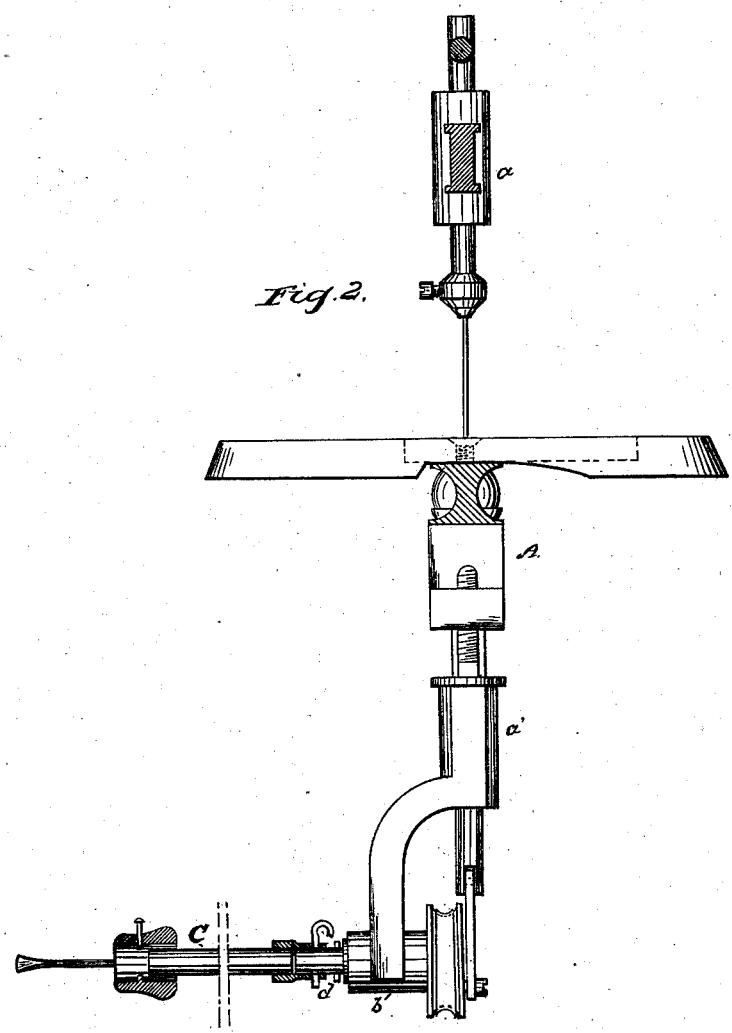

WILLIAM H. TUFTS, OF HOWARD COUNTY, MARYLAND.

IMPROVEMENT IN SCROLL-SAWING MACHINES.

Specification forming part of Letters Patent No. 193,057, dated July 10, 1877; application filed March 21, 1877.

*To all whom it may concern:*

Be it known that I, WM. H. TUFTS, of Howard county, and State of Maryland, have invented certain new and useful Improvements in Scroll-Sawing Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to that class of scroll-sawing machines used principally for cutting out ornamental devices from wood, ivory, and other materials, the object being to produce a machine that shall be capable of performing as great a variety of this kind of work as possible, with few changes in the arrangement of the working parts; and the invention consists in the means employed for giving to the table any desired inclination, and in the arrangement of devices for perforating the material to be sawed, as will be hereinafter fully described, and then specifically pointed out in the claim.

Figure 1 represents a side view of the machine as constructed for application to the table of a sewing-machine, or other light motor. Fig. 2 is a vertical section of the same through the frame in the rear of the saw.

A represents the frame of the machine, which is preferably cast in one piece, thus saving expense in fitting up and inserting the greatest amount of rigidity, with a minimum quantity of metal. The upper and lower guides $a$ and $a'$, as well as the shaft-bearing $b$, are cast solid and afterward bored out, thus insuring a correct vertical movement of the saw-slides, and a perfect right angle therewith to the axis of the shaft $d$ without danger of the parts getting out of line by the shifting of guides or journal-boxes, as frequently happens in machines where the various parts are constructed separately, and then united by bolts and screws. Attached to the central portion of the frame, and directly in line with the guides, is a ball, $c$, pierced vertically by a hole, through which the saw reciprocates.

This ball forms the principal support for the table B, which has a cup-shaped cavity upon its under side that rests upon the ball, while the concave perforated support $e$ is attached by means of a tightening-screw to the under side of the table, and embraces the lower portion of the ball, thus forming a ball-and-socket joint, which allows the table to be turned and secured in any position required. To still further secure the table, when in an inclined position, a wedge-shaped segment (shown in dotted lines at $f$, Fig. 1,) may be employed in connection with a similarly-inclined surface upon the under side of the table, which, by giving the table a partial rotation, will cause its rear side to raise or lower, as shown in the drawing.

The devices for giving motion to the saw are of the simplest form. A pulley, $g$, upon one end of the shaft $d$, serves to receive the driving-belt, and, by means of an inserted crank-pin and pitman, gives a reciprocating motion to the lower slide, to the upper end of which is attached the saw, its proper vertical movement being secured by its attachments to the upper slide moving in the guide $a$.

The straining of the saw is accomplished by a spring, $h$, attached to the upper slide, thus giving all the necessary working parts without complication. As it is frequently necessary to bore holes through the material for the passage of the saw in fret-sawing, it becomes desirable to have a ready means for accomplishing that object, which I secure by attaching to the end of the shaft $d$, by means of a suitable coupling, one end of the rubber tube C, the opposite end of said tube being provided with a drill-holder, $k$, in which is inserted a drill, or other boring-tool of such size as the work may require. Experience has proved that a small rubber tube, when rapidly rotating, has sufficient strength to overcome the torsion caused by the boring-tool, while its elasticity enables the operator to bore holes in any direction by simply applying the tool to the spot where the hole is wanted and pushing it forward in the desired direction.

Having thus described my invention, I claim as new, and desire to secure by Letters Patent, the following:

1. The perforated ball c, in combination with the table B and concave perforated support e, substantially as and for the purpose specified.

2. The frame A, provided with the ball c, in combination with the table B, having the adjusting-inclines f, as shown and described.

3. In a scroll-sawing machine the frame A and shaft d, in combination with the rubber tube C, provided with a drill-holder, in the manner and for the purpose set forth.

In testimony that I claim the foregoing as my own I hereunto affix my signature in presence of two witnesses.

WM. H. TUFTS.

Witnesses:
ATHENA TUFTS,
CLARISSA MELLEN.